US005290379A

United States Patent [19]

Higgins

[11] Patent Number: 5,290,379

[45] Date of Patent: Mar. 1, 1994

[54] METHOD OF MAKING A TEMPORARY SIGN PANEL

[76] Inventor: Joseph M. Higgins, Ga Regional Hospital at Atlanta, 3073 Panthersville Rd., Decatur, Ga. 30032

[21] Appl. No.: 880,040

[22] Filed: May 8, 1992

[51] Int. Cl.[5] ........ B32B 31/00

[52] U.S. Cl. ........ 156/280; 40/615; 52/DIG. 9; 156/299; 156/300; 156/312; 428/2; 428/77

[58] Field of Search ........ 156/280, 300, 299, 312, 156/94; 40/615; 428/277; 52/DIG. 9

[56] References Cited

U.S. PATENT DOCUMENTS 4,300,322 11/1981 Clark ........ 52/DIG. 9

*Primary Examiner*—John J. Gallagher

*Attorney, Agent, or Firm*—James B. Middleton

[57] ABSTRACT

A temporary sign panel is made by placing sheets of used newspaper on a flat surface to form a first layer, fixing two edges of the first layer to the surface, and covering the layer with a flour and water paste. A second layer of newspaper is placed on the first, with the sheets staggered so lines between sheets do not coincide. Two edges of the second layer are fixed to the surface, and the second layer is covered with flour and water paste. Next, a third layer of newspaper is placed over the second, staggered so no lines between sheets coincide. The paste is allowed to dry, then the panel is removed from the surface, and the entire panel is painted with an exterior grade of house paint. The resulting panel can be painted with the desired sign, and the panel is stiff enough for normal display.

6 Claims, 2 Drawing Sheets

METHOD OF MAKING A TEMPORARY SIGN PANEL

FIELD OF THE INVENTION

This invention relates generally to sign panels, and is more particularly concerned with a generally rigid, temporary sign panel or banner.

BACKGROUND OF THE INVENTION

Signs that are intended to be relatively permanent are typically constructed of wood, metal or plastic, and such signs last for many years, depending on the exact construction and the environment of the sign. Signs that are intended to be relativey temporary are typically constructed of paper, or a flexible plastic film that is a few thousandths of an inch, or around a tenth of a millimeter in thickness. Of course the paper may have an extremely short useful life in the event of inclement weather, including both precipitation and wind. The flexible plastic film may last quite well, even in inclement weather, but the fact that the sign is flexible frequently allows the sign to be rendered unreadable. As a flexible plastic sign, or banner, flutters in the wind, most of the sign on the material will be illegible. Furthermore, the usual plastic banner or sign is rather thin and translucent, so only one side of the material can be effectively used for a sign.

Obviously, better sign materials are known in the art, but the better materials tend to be prohibitively expensive for signs that are intended to be used briefly. The prior art does not include a material that is durable enough to be practical and inexpensive enough to be economical for temporary signs.

SUMMARY OF THE INVENTION

The present invention provides a temporary sign panel, and a method for making the panel. The panel of the present invention is preferably constructed from used newspapers or the like for economy, though it will be obvious that other particular papers will also provide a satisfactory panel. The paper is carefully laid on a surface, and the two edges of the first layer are fixed to the surface. The layer of paper is then coated with paste. A second layer of paper is placed over the first, and the opposite edges are fixed to the surface. The second layer is coated with paste, and a third layer of paper is placed over the second. All edges of the third layer remain free. After the paste has dried, or cured, the edges are released from the surface, and the resulting board is painted, preferably with a waterproof paint such as exterior grade house paint.

The ends of the resulting panel may be provided with holes so that two or more panels can be fixed together to yield a larger panel. Such holes can also provide hanging means for the panel so the completed sign can be fixed in place.

BRIEF DESCRIPTION OF THE DRAWINGS

These and other features and advantages of the present invention will become apparent from consideration of the following specification when taken in conjuntion with the accompanying drawings in which.

DETAILED DESCRIPTION OF THE EMBODIMENT

Figure 1:
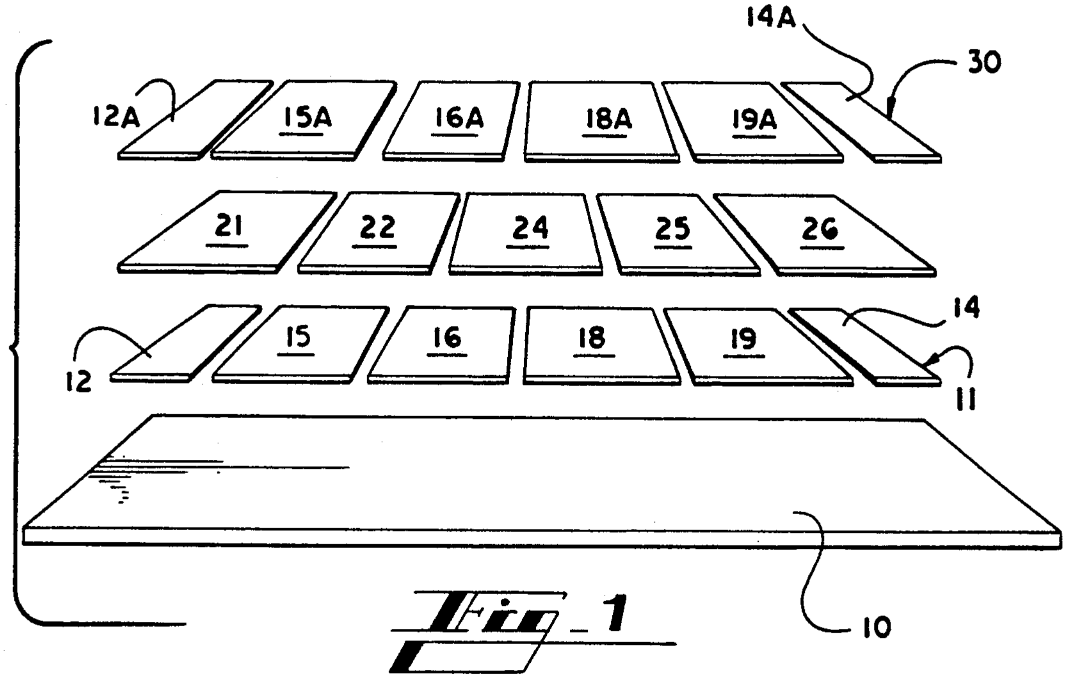
FIG. 1 is an exploded, perspective view showing the several layers for constructing a panel in accordance with the present invention.

Referring now more particularly to the drawings, and to that embodiment of the invention here presented by way of illustration, FIG. 1 illustrates the structure of a temporary panel in accordance with the present invention. There is a base member, 10 on which the panel is to be assembled. Though any of numerous materials may be used as the base member 10, one material that is both effective and economical is plywood. The plywood should be thick enough to remain quite flat, perhaps around ¾", or about 2 cm.

The base member receives a plurality of layers that make up the temporary sign panel. As illustrated in FIG. 1, there is a first layer 11 which includes half-sheets 12 and 14 of paper at each end. Between the half-sheets 12 and 14 are four whole sheets 15, 16, 18 and 19.

The reason for the particular arrangement in the first layer 11 can be understood by looking at the second layer 20. The second layer 20 comprises five whole sheets 21, 22, 24, 25 and 26. Since all the sheets are full sheets, it will be observed that the lines between the sheets of the first layer 10 fall on the sheets of the second layer 20.

As used in the present description, the terms half-sheet and whole sheet relate directly to standard newspaper size, the preferred embodiment of the present invention comprising used newspaper. However, it will be readily understood by those skilled in the art that other papers can be used equally well; indeed, other papers may provide a superior product, but one object of the present invention is to utilize waste. Use of used newspapers will use what is otherwise trash, and is of course very economical. Also, while standard size newspapers are contemplated, it will be recognized that the dimensions can be changed to accommodate tabloid size newspapers, or other sizes. Thus, considerable variation is possible, but the embodiment of the invention here presented is thought to be the best economically and ecologically.

Referring again to FIG. 1 of the drawings, the third layer 30 is the same as the first layer 10, and the individual pieces have the same numerals with an A suffix. As before, in view of the half-sheets in the third layer 30, the lines between sheets in the third layer will fall on the sheets in the second layer 20, so no two lines overlap.

Figure 2:
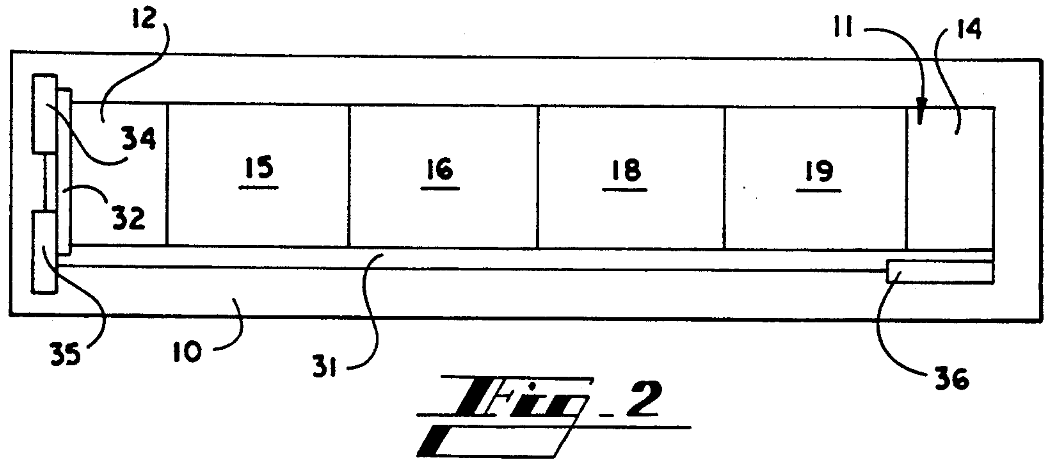
FIG. 2 is a top plan view showing a first layer fixed to a surface in accordance with the present invention.

Attention is now directed to FIG. 2 of the drawings to understand the precise construction of the sign panels of the present invention. It will be seen that the layer 11 is placed on the base member 10, the various sheets and half-sheets being carefully placed contiguously. To hold the layer 11 in place, edges of the layer are taped to the base member 10. First, the lower edges of all the sheets 12–19 are fixed to the base member 10, as by the length of tape indicated at 31. Also, the left hand end of the layer 11 is fixed to the base member 10 as by the length of tape 32.

To assure that the layer 11 remains in place throughout the process, it is desirable to reinforce the tape 31 and 32. As here shown, there are additional strips of tape 34 and 35 partially overlapping the strip 32; and, there is a short strip 36 at the right-hand end of the strip 31.

Though the strips of tape 31-36 are here shown as single lengths of tape, those skilled in the art will understand that a plurality of short lengths would be the full equivalent. The object is to have the entire edges carefullly taped to the base member, and details of the manner of taping are not of great importance.

Once the layer 11 is fully in place as shown in FIG. 2 of the drawings, the entire surface of the layer will be coated with paste or the like. The paste is preferably made of flour and water, and this will be discussed in more detail hereinafter. It is important that both the tap@and the paste must leave the right hand edge of the first layer 11 free to move with respect to the base board 10.

Figure 3:
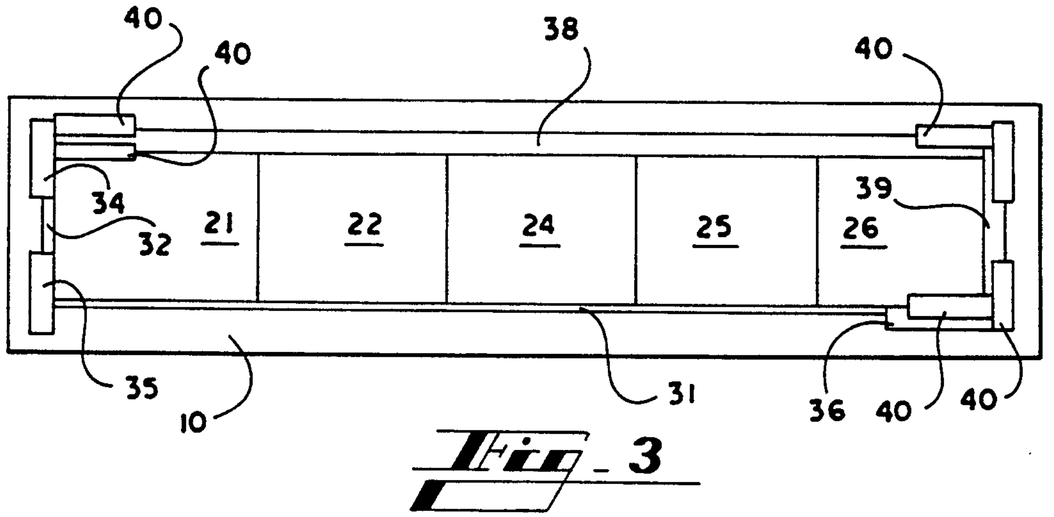
FIG. 3 is a view similar to FIG. 1 but showing a second layer in place.

FIG. 3 shows the second layer 20 placed over the first layer 11. The second layer 20 is then held in place by having the upper edge and the right-hand edge fixed to the base board 10. The upper edge is fixed to the base board 10 by a strip of tape 38, and the right-hand edge is fixed to the base board by a strip of tape 39. It should be noted that the first layer 11 has the left and bottom edge fixed to the base board 10, and the second layer 20 has the top and right-hand edge fixed to the base board 10. The fixing of the opposite edge to the base board allows slippage between layers as the paste dries, or cures, to hold the sign panel flat. The second layer 20 includes additional strips of tape indicated at 40 to reinforce the principal strips 38 and 39.

Figure 4:
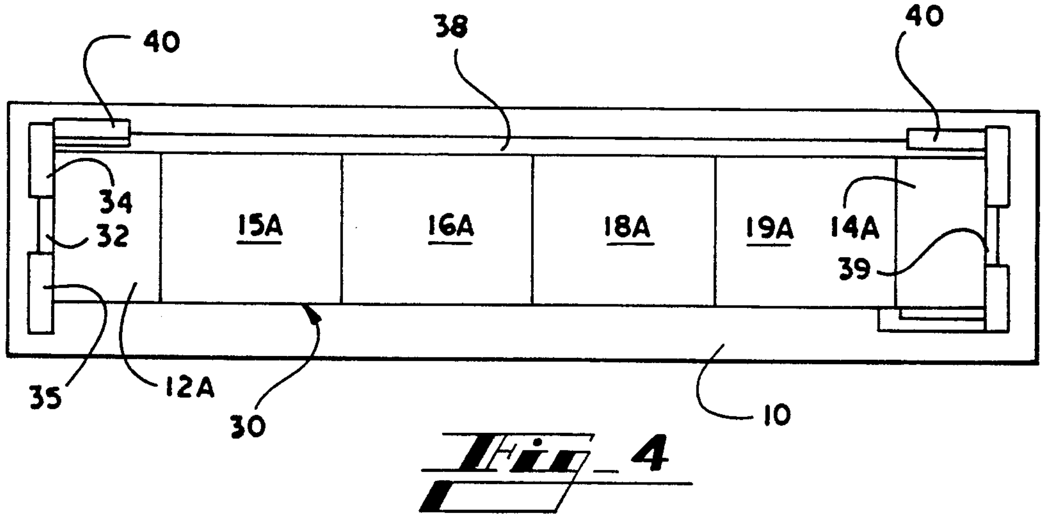
FIG. 4 is a view similar to FIG. 1 but showing a third layer in place.

With the second layer 20 in place, paste is spread completely over the layer. Finally, the third layer 30, shown in FIG. 4 is placed over the second layer 20. It will be noticed that the third layer 30 is not directly fixed to the base board 10; that is the third layer 30 is held by only the paste between the second layer 20 and the third layer 30. This carries out the aforementioned scheme whereby each layer can slip somewhat with respect to other layers.

Those skilled in the art will understand that, normally, when sheets of paper are adhered together using a paste such as a flour and water paste, the paper curls, curves and generally assumes a shape other than flat. The inventor herein believes the reason for the curling is the uneven stressing of the materials due to shrinkage of certain layers of the material. Thus, the present invention contemplates the placing of a plurality of layers, each layer having at least two free edges so each layer can shrink relative to other layers.

Figure 5:
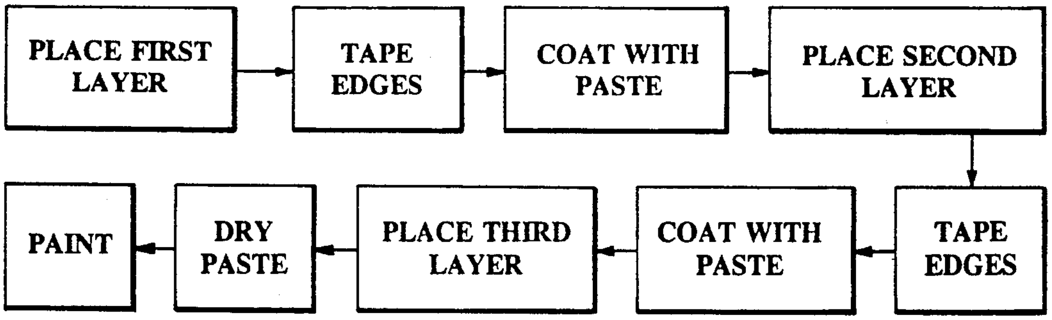
FIG. 5 is a flow chart showing the steps for producing the device as illustrated in FIGS. 1-4; and, FIG. 6 is a perspective view showing two panels made in accordance with the present invention, and means for joining the panels.

To consider further the process for assembling the panels in accordance with the present invention, attention is directed to the flow chart of FIG. 5. As has been discussed above, the first step is to place the first layer 11 on the base board 10 and to tape the left and bottom edge to the base board 10. Next, the entire layer 11 is coated with paste.

While those skilled in the art may find other pastes or adhesives for use in assembly of the panels of the present invention, it has been found that a flour and water paste works well, and is very economical. To coat the first layer 11, the paste is preferably a litle heavier than the paste to coat the second layer. One successful recipe is $1\frac{1}{2}$ parts hot water to $2\frac{1}{4}$ parts flour as a paste for the first, or bottom, layer 11. For the second, or top, layer 20, the recipe is altered to $1\frac{1}{2}$ parts hot water to 2 parts flour. In both recipes, the measurements are volumetric.

Thus, after the first layer 11 is coated with paste, the second layer 20 is placed as shown in FIGS. 1 and 3, and the second layer is taped down, then coated with paste.

The third layer 30 is next placed carefully over the second layer 20. The sheets of the third layer should be carefully smoothed to lie flat on the second layer, but the third layer is not directly adhered to the base board 10. Due to the arrangement described, as the paste dries, the various layers can shrink, and move with respect to one another, so the panel as a whole will remain flat.

After the panel has thoroughly dried, the tape can be removed, or severed, to remove the panel from the base board 10. The panel is then ready to be painted. It will be readily understood that the panel made of used newspapers will have printing substantially throughout the panel; further, the panel made of paper and flour and water paste will not be very resistant to weather. Thus, the final step in the production of the panel of the present invention is to paint the entire panel. The paint will preferably be an exterior grade house paint, or other paint that will completely cover the printed material and completely seal the panel from the weather.

Figure 6:
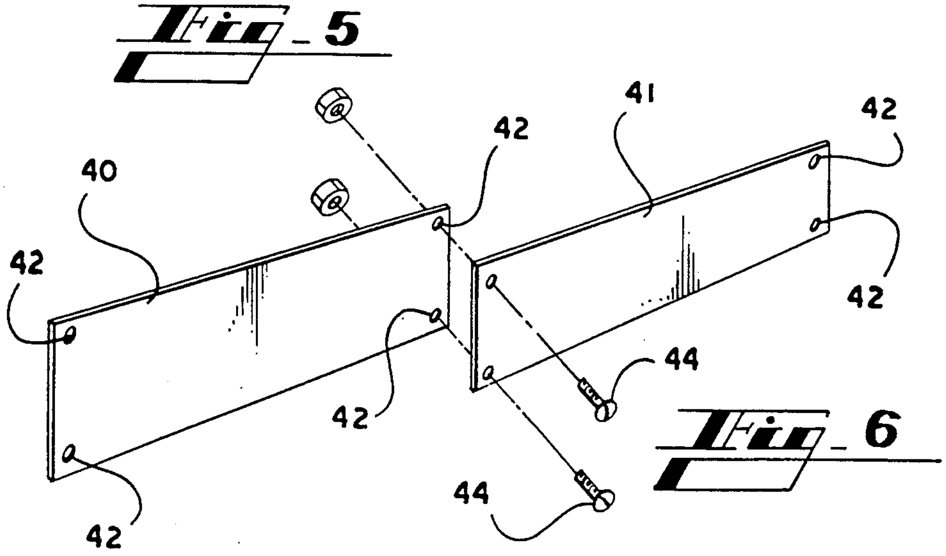

FIG. 6 shows two panels 40 and 41 as may be made in accordance with the present invention. In the event a larger panel is needed, one can fix two or more panels together. As shown in FIG. 6, holes 42 are provided in the ends of the panels, and screws 44 pass through the holes to secure the panels together. The remaining holes may be used to hang the panels after the desired sign has been painted or printed thereon.

It will therefore be understood by those skilled in the art that the present invention provides a very inexpensive sign panel that is made from newspaper or the like which is otherwise mere waste. The sign panel of the present invention in generally rigid so it will not fold to obscure lettering thereon. The use of a coat of good paint will protect the panel to yield a sufficiently long life for most temporary sign panels.

It will of course be understood by those skilled in the art that the particular emobidment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A method for making a generally flat temporary sign panel, said method comprising the steps of placing a first layer of paper on a base member, said first layer consisting of a plurality of sheets of paper laid side by side, fixing two adjacent edges of said first layer of paper to said base member, coating said first layer of paper with a quantity of adhesive, placing a second layer of paper on said first layer of paper, said second layer consisting of a plurality of sheets of paper laid side by side, and fixing two adjacent edges of said second layer to said base member, said two adjacent edges of said second layer being opposite said two adjacent edges of said first layer, coating said second layer of paper with a second quantity of adhesive, placing a third layer of paper on said second layer of paper, said third layer consisting of a plurality of sheets of paper laid side by side, and including the step of sizing the sheets of paper in said first, second and third layers so that the lines between adjacent sheets in one layer will not be aligned with the lines between sheets in an adjacent layer, and allowing said adhesive to dry.

2. A method as claimed in claim 1, wherein said step of fixing two adjacent edges of said first layer of paper to said base member comprises the step of taping the lower edge and the left hand edge to said base member.

3. A method as claimed in claim 2, wherein said step of fixing two adjacent edges of said second layer to said base member comprises the step of taping the upper edge and the right hand edge to said base member.

4. A method as claimed in claim 3, wherein the said step of coating said first layer with a quantity of adhesive consists of coating said first layer with an adhesive consisting of about 1½ parts water and about 2¼ parts flour, by volume.

5. A method as claimed in claim 4, wherein the said step of coating said second layer with a second quantity of adhesive consists of coating said second layer with an adhesive consisting of about 1½ parts water and about 2 parts flour, by volume.

6. A method as claimed in claim 5, and further including the step of painting said panel with an exterior grade of house paint.

* * * * *